United States Patent [19]

Hall

[11] Patent Number: 5,784,049

[45] Date of Patent: Jul. 21, 1998

[54] IMAGE DISPLAY USING EVENLY DISTRIBUTED INTENSITY CLUSTERS

[75] Inventor: Daniel Hall, Cambridge, England

[73] Assignee: The Harlequin Group Ltd., Cambridge, England

[21] Appl. No.: 768,849

[22] Filed: Dec. 18, 1996

Related U.S. Application Data

[63] Continuation of Ser. No. 282,607, Jul. 29, 1994, abandoned.

[51] Int. Cl.$^6$ ............................................. G09G 5/10
[52] U.S. Cl. ............................................. 345/149; 358/457
[58] Field of Search ............................ 345/147, 149; 358/456–458; 382/274

[56] References Cited

U.S. PATENT DOCUMENTS

| | | | |
|---|---|---|---|
| 4,736,254 | 4/1988 | Kotera et al. | 358/283 |
| 4,837,613 | 6/1989 | Paxton et al. | 358/75 |
| 4,958,272 | 9/1990 | Wake | 364/518 |
| 5,016,191 | 5/1991 | Radochonski | 364/518 |
| 5,111,310 | 5/1992 | Parker et al. | 358/456 |
| 5,225,915 | 7/1993 | Ciccone et al. | 358/454 |
| 5,235,435 | 8/1993 | Schiller | 358/456 |
| 5,267,054 | 11/1993 | Chang et al. | 358/456 |
| 5,287,195 | 2/1994 | Blumer | 358/298 |
| 5,305,118 | 4/1994 | Schiller et al. | 358/456 |
| 5,307,181 | 4/1994 | Levien | 358/456 |
| 5,315,669 | 5/1994 | Kumagai | 382/50 |
| 5,526,438 | 6/1996 | Barton | 382/237 |

FOREIGN PATENT DOCUMENTS

| | | | |
|---|---|---|---|
| 0199469 | 10/1986 | European Pat. Off. | H04N 1/40 |
| 0293214 | 11/1988 | European Pat. Off. | H04N 1/40 |
| 0369302 | 5/1990 | European Pat. Off. | H04N 1/40 |
| 560285 A1 | 3/1992 | European Pat. Off. | H04N 1/40 |
| 0501126 | 9/1992 | European Pat. Off. | H04N 1/40 |
| 0606992 | 1/1994 | European Pat. Off. | H04N 1/40 |

OTHER PUBLICATIONS

Foley, et al., *Computer Graphics: Principles and Practice*, Addison–Wesley Publishing Co., 1990.

Ulichney, Robert, *Digital Halftoning*, (Cambridge, Massachusetts: MIT Press, 1987) (ISBN#0-262-21009-6), entire book.

*Primary Examiner*—Jeffery Brier
*Attorney, Agent, or Firm*—Fenwick & West LLP

[57] ABSTRACT

A method and apparatus for digital halftoning provides evenly distributed intensity clusters within a halftone cell. Pixel illumination ordering is determined based on adjacency from a candidate pixel to other pixels already placed in the order of illumination. Separate head and tail intensity arrays are used so that pixel ordering proceeds from both the first and last illuminated pixels toward pixels in the center of the illumination order.

20 Claims, 14 Drawing Sheets

```
079 102 041 070 004 071 178 122 125 068 026 223 001 191 231 250
224 000 078 206 129 029 146 112 063 150 192 014 186 209 099 074
132 165 037 252 023 184 022 198 084 164 133 046 217 244 011 222
082 038 118 075 098 175 137 213 193 237 096 135 058 190 181 036
131 077 055 121 188 157 027 030 009 239 149 088 081 056 120 247
160 201 108 086 113 076 169 234 148 236 052 154 017 177 043 103
210 053 018 248 130 144 020 066 100 225 097 172 158 080 013 049
255 089 035 142 025 205 006 145 151 179 230 162 173 054 253 246
221 111 196 233 109 134 045 242 008 085 105 101 040 060 200 159
156 016 229 003 092 185 204 062 143 039 115 136 182 238 051 114
152 002 141 163 202 211 171 064 235 251 245 138 153 015 032 024
072 167 139 126 031 203 010 226 187 117 042 168 212 057 180 127
140 174 166 123 197 227 189 240 194 021 147 093 106 050 254 161
048 124 019 128 214 087 012 243 228 176 241 090 094 110 199 183
067 065 155 218 208 107 170 195 034 083 005 007 104 059 232 215
216 069 044 116 061 091 207 028 047 073 033 220 249 095 119 219
```

|  |  |  |  |  |  |  |  |  |  |  |  |  |  |  | 5 |
|---|---|---|---|---|---|---|---|---|---|---|---|---|---|---|---|
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |
| -1 | -1 | -1 | -1 | -1 | -1 | -1 | -1 | -1 | -1 | -1 | -1 | -1 | -1 | -1 | -1 |

A grid labeled 320 containing rows and columns of "0.00" values.

```
 0  255 226  -1  -1  -1| 49   9  246 251 222 207  -1  -1  42   4
12   -1  -1  -1  -1  -1| -1  -1   -1  -1  -1  -1  -1  -1  -1   8
-1   -1  -1  -1  -1 197|201  -1   -1  -1  59  62 198 195  -1
-1  208 212  30  18 236|230 216  44  -1  -1  24  27 239 241  -1
48  206 210  31  16  20|232 224  54  -1  -1  29  22 229 235  52
46   -1  -1  -1  58 (-1) -1  -1   -1  -1  -1  -1  -1  -1  -1  50
-1   -1  -1  -1  -1  -1  -1  -1   -1 196 192  -1  -1  -1  -1
-1   -1 248 244  -1  -1  -1  -1   11   5 243 249  41  34 213 218
 7    3 252 242  40  38 219 220   14   1 254 245  36  32 211 217
13   10  -1  -1  43  35 215 221   61  -1  -1  -1  -1  -1  -1  -1
-1  194  -1  -1  -1  -1  -1  -1   -1  -1  -1  -1  -1  -1  -1  -1
63  199 202  -1  -1  -1  -1  -1   -1 203 204  56  -1 227 233  57
53   -1  -1  28  23 240 238  -1   -1 200  55  19  15 237 231  51
-1   -1  -1  25  26 234 228  -1   -1  -1  -1  21  17  -1  -1  -1
205 214  -1  60  -1 193 (-1) 37   33  -1  -1  -1  -1  -1  -1  -1
247 250 223  -1  -1  -1  47   6    2 253 225 209  -1  -1  45  39
```

501 (top marker), 502 (bottom marker), 500 (figure label)

| | | | | | | | | | | | | |
|---|---|---|---|---|---|---|---|---|---|---|---|---|
| 3.88 | 4.28 | 4.44 | 4.30 | 4.46 | 4.22 | 3.92 | 3.83 | 4.26 | 4.42 | 4.41 | 4.46 | 4.73 | 4.52 | 4.01 | 3.52 |
| 4.02 | 4.25 | 4.47 | 4.37 | 4.46 | 4.35 | 4.24 | 4.34 | 4.53 | 4.57 | 4.32 | 4.23 | 4.42 | 4.68 | 4.58 | 4.02 |
| 4.55 | 4.55 | 4.40 | 4.16 | 4.23 | 4.48 | 4.68 | 4.38 | 4.30 | 4.42 | 4.39 | 4.01 | 4.11 | 4.72 | 5.02 | 4.71 |
| 4.53 | 4.68 | 4.39 | 3.90 | 3.73 | 4.15 | 4.51 | 4.03 | 3.94 | 4.27 | 4.39 | 3.65 | 3.71 | 4.53 | 4.94 | 4.62 |
| 3.88 | 4.50 | 4.56 | 3.82 | 3.52 | 3.96 | 4.55 | 4.08 | 3.97 | 4.25 | 4.57 | 4.12 | 4.18 | 4.75 | 4.65 | 3.93 |
| 3.86 | 4.42 | 4.73 | 4.25 | 4.01 | (4.10) | 4.46 | 4.36 | 4.42 | 4.55 | 4.64 | 4.52 | 4.65 | 4.94 | 4.59 | 3.91 |
| 4.51 | 4.63 | 4.75 | 4.58 | 4.67 | 4.61 | 4.67 | 4.44 | 4.34 | 4.37 | 4.64 | 4.76 | 4.59 | 4.58 | 4.57 | 4.53 |
| 4.53 | 4.41 | 4.54 | 4.57 | 4.39 | 4.35 | 4.60 | 4.41 | 3.91 | 3.91 | 4.54 | 4.55 | 3.92 | 3.93 | 4.56 | 4.86 |
| 3.94 | 3.90 | 4.51 | 4.48 | 3.82 | 3.81 | 4.50 | 4.31 | 3.67 | 3.71 | 4.58 | 4.54 | 3.88 | 3.89 | 4.57 | 4.60 |
| 4.12 | 4.02 | 4.57 | 4.53 | 3.84 | 3.79 | 4.40 | 4.36 | 4.08 | 4.14 | 4.70 | 4.67 | 4.42 | 4.40 | 4.77 | 4.67 |
| 4.31 | 4.46 | 4.78 | 4.75 | 4.47 | 4.30 | 4.36 | 4.27 | 4.31 | 4.51 | 4.62 | 4.65 | 4.72 | 4.91 | 4.71 | 4.44 |
| 4.12 | 4.69 | 4.81 | 4.48 | 4.46 | 4.50 | 4.41 | 4.29 | 4.42 | 4.44 | 4.14 | 4.06 | 4.33 | 4.82 | 4.52 | 4.02 |
| 3.94 | 4.59 | 4.61 | 3.98 | 3.89 | 4.28 | 4.55 | 4.45 | 4.57 | 4.52 | 4.03 | 3.60 | 3.91 | 4.67 | 4.61 | 3.95 |
| 4.47 | 4.72 | 4.25 | 3.67 | 3.70 | 4.51 | 4.69 | 4.34 | 4.46 | 4.46 | 4.30 | 3.84 | 4.05 | 4.60 | 4.90 | 4.59 |
| 4.78 | 4.82 | 4.23 | 4.05 | 4.20 | 4.67 | 4.46 | 3.90 | 3.99 | 4.44 | 4.66 | 4.35 | 4.41 | 4.52 | 4.61 | 4.66 |
| 4.37 | 4.55 | 4.28 | 4.26 | 4.51 | 4.48 | 3.91 | 3.44 | 3.85 | 4.32 | 4.56 | 4.51 | 4.73 | 4.45 | 4.10 | 3.98 |

511 (indicates circled value 4.10)

| | | | | | | | | | | | |
|---|---|---|---|---|---|---|---|---|---|---|---|
| 4.36 | 3.96 | 4.04 | 4.35 | 4.66 | 4.63 | 4.71 | 4.53 | 4.19 | 3.88 | 3.67 | 3.99 | 4.29 | 4.61 | 4.55 | 4.54 |
| 4.76 | 4.65 | 4.57 | 4.61 | 4.50 | 4.32 | 4.45 | 4.52 | 4.46 | 4.26 | 4.27 | 4.43 | 4.38 | 4.32 | 4.28 | 4.59 |
| 4.79 | 4.57 | 4.55 | 4.73 | 4.47 | 4.04 | 3.96 | 4.46 | 4.72 | 4.68 | 4.58 | 4.72 | 4.43 | 4.01 | 4.03 | 4.54 |
| 4.63 | 3.91 | 3.89 | 4.53 | 4.63 | 3.97 | 3.51 | 3.92 | 4.34 | 4.47 | 4.30 | 4.57 | 4.22 | 3.61 | 3.66 | 4.51 |
| 4.57 | 3.88 | 3.86 | 4.43 | 4.76 | 4.39 | 3.91 | 3.96 | 4.24 | 4.51 | 4.45 | 4.70 | 4.49 | 4.11 | 4.15 | 4.68 |
| 4.67 | 4.44 | 4.48 | 4.61 | 4.71 | 4.54 | 4.35 | 4.28 | 4.42 | 4.40 | 4.25 | 4.40 | 4.55 | 4.62 | 4.63 | 4.78 |
| 4.65 | 4.72 | 4.48 | 4.34 | 4.41 | 4.59 | 4.69 | 4.71 | 4.73 | 4.40 | 4.03 | 4.11 | 4.70 | 4.95 | 4.60 | 4.47 |
| 4.54 | 4.55 | 3.87 | 3.80 | 4.31 | 4.52 | 4.23 | 4.27 | 4.68 | 4.38 | 3.66 | 3.71 | 4.59 | 4.71 | 3.95 | 3.89 |
| 4.60 | 4.65 | 3.94 | 3.84 | 4.43 | 4.41 | 3.78 | 3.81 | 4.54 | 4.67 | 4.15 | 4.15 | 4.70 | 4.62 | 3.93 | 3.91 |
| 4.51 | 4.56 | 4.34 | 4.43 | 4.59 | 4.36 | 3.82 | 3.86 | 4.51 | 4.85 | 4.58 | 4.49 | 4.69 | 4.75 | 4.54 | 4.50 |
| 4.39 | 4.07 | 4.13 | 4.59 | 4.70 | 4.59 | 4.48 | 4.47 | 4.49 | 4.42 | 4.38 | 4.62 | 4.59 | 4.40 | 4.50 | 4.78 |
| 4.41 | 3.95 | 3.93 | 4.46 | 4.51 | 4.38 | 4.51 | 4.80 | 3.94 | 3.93 | 4.55 | 4.53 | 4.34 | 3.77 | 3.81 | 4.47 |
| 4.75 | 4.42 | 4.27 | 4.53 | 4.39 | 3.92 | 3.92 | 4.51 | 4.37 | 3.94 | 3.93 | 4.53 | 4.26 | 3.70 | 3.75 | 4.42 |
| 4.50 | 4.60 | 4.76 | 4.89 | 4.17 | 3.64 | 3.68 | 4.47 | 4.64 | 4.63 | 4.65 | 4.74 | 4.38 | 4.15 | 4.24 | 4.38 |
| 4.01 | 3.96 | 4.42 | 4.75 | 4.32 | 4.07 | (4.12) | 4.67 | 4.72 | 4.60 | 4.33 | 4.35 | 4.35 | 4.48 | 4.60 | 4.32 |
| 3.87 | 3.49 | 3.93 | 4.45 | 4.47 | 4.37 | 4.46 | 4.57 | 4.21 | 3.92 | 3.65 | 3.95 | 4.17 | 4.42 | 4.45 | 4.28 |

701: FOR ALL i,j WHERE O[i,j]=-1 SELECT THE ELEMENT WHERE (H[i,j]+(K*M[i,j])) HAS THE MINIMUM VALUE

702: FOR ALL i,j WHERE O[i,j]=-1 SELECT THE ELEMENT WHERE (T[i,j]-(K*M[i,j])) HAS THE MINIMUM VALUE

IMAGE DISPLAY USING EVENLY DISTRIBUTED INTENSITY CLUSTERS

RELATED APPLICATIONS

This is a continuation of application Ser. No. 08/282,607 filed on Jul. 29, 1994 now abandoned.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND AND FIELD OF THE INVENTION

This invention relates generally to the field of image display and reproduction, and specifically to the display and reproduction of digitally-stored monochrome and color images using evenly distributed intensity clusters, where such display and reproduction is accomplished using a monitor, a printer, a plotter, or a typesetter. The digital images may consist of elements that have been scanned, manually digitized graphics, or computer generated graphics or text.

Color and monochrome reproduction devices such as monitors, printers, and typesetters display, print, or typeset images using a grid of pixels. In such systems each pixel in the grid of pixels is set to a pixel intensity value within a range of possible intensity values. The permitted range of possible values is determined by the printing or display process adopted.

In many systems the range of pixel intensity values present in the digital image to be reproduced is greater than the range of pixel intensity values permitted by the display, printing or typesetting process. For example, the digital image might contain color values represented by 8 bits (256 possible levels of intensity) per pixel per color channel, while the printing device may be capable at any given point on the paper of printing ink, or leaving the paper without ink, resulting in 1-bit (two possible levels of intensity) per pixel per color channel. In these cases images must be reproduced by setting the intensity values of pixels such that, over a suitably chosen area, the average of the pixel intensity values of the displayed, printed, or typeset image is approximately equal to the average image pixel intensity over the same area of the digital image. This process is known as "halftoning."

Many methods exist for converting from many bits per pixel to few bits per pixel. One such method is known as "threshold array" halftoning. Using this method a threshold array is defined that contains data representing a halftone screen element, or a spot function, that is repeated periodically across the image to be reproduced. The spot function contains data with the same range as that of the digital image data to be halftoned and at the same resolution as the output device. As the value of each output pixel is calculated the corresponding pixel in the threshold array is selected, along with the corresponding digital image input pixel. For each output pixel the value of the then current input pixel and the threshold array pixel are compared. If the input data pixel value is higher than the threshold array pixel the corresponding output pixel is set to its "on" state. If the input data value is less than or equal to the threshold array pixel the corresponding output pixel is set to its "off" state. The values of the pixels in the threshold array, or the "spot function" determines the shape of the resulting half tone dot for any given shade of tone or color of the input data.

The values of the pixels in the threshold array also indicate the order in which the corresponding device pixels are to be illuminated as the gray, or color, intensity is increased from zero to full intensity. This is referred to as the order of illumination of pixels. If this processing is employed in an environment were an output pixel may have more than two levels, known methods may be used to apply the halftone cell description to a multilevel output device.

Most halftone screening systems using threshold arrays use spot functions that create highly clustered halftone dots having compact and regular shapes such as squares, ellipses, or circles on grids of fixed spatial frequency, or line screen ruling that typically ranges from about 65 lines per inch to about 200 lines per inch. This regular and fixed pattern of dots causes interference, or moiré, patterns under a wide variety of conditions. The fixed and regular screen ruling and highly clustered dot structure also limits the visual sharpness of pictures reproduced using this method.

Threshold array spot functions can also be created that are not clustered. A non clustered but regular halftone dot shape is produced by Bayer dither that can easily be expressed in terms of a spot function or a threshold array. Bayer dither produces results that have very fine structures, and thus cannot be printed using some systems. Bayer dither also maintains a very regular pattern that causes severe interference, or moiré, patterns under some conditions.

It is also possible to produce non clustered structures that do not form a regular, periodic, pattern by defining the spot function as successive samples of a random and uncorrelated variable.

Though "random" screening is free from moiré effects due to the fact that no regular pattern exists, and produces images with greater apparent sharpness than does conventional clustered dot screening, random screening suffers from two major drawbacks. Because it is random and uncorrelated, clusters of random size and position form. These clusters may make images look "noisy" or "grainy." Because many of the structures using random screening are uncontrollably small and since, at any given shade of tone or color, structures of many different sizes are present due to the random clustering of output pixels, the resulting random halftone patterns are difficult to print and some printing processes that use them are inherently unstable.

It is possible to shape the "spectrum" of a random screen structure. This still results in random patterns, but introduces some correlation which reduces the appearance of graininess to some degree.

Some other known techniques for digital halftoning operate by selecting a suitable halftone pixel value, estimating the error between this value and the digital image input pixel intensity value, and compensating for this error when selecting the halftone pixel value for neighboring pixels. These techniques are known collectively as error diffusion halftoning. Error diffusion halftoning has the disadvantage of producing distracting artifacts in the form of long and narrow connected structures, and is computationally intensive, thus causing very long data processing times.

The halftones produced using any of the known "non-clustered" techniques cannot be accurately imaged using some standard printing techniques as in some cases individual pixels are produced that are smaller than the minimum size that can be reproduced. Techniques aimed at improving printability by simple pixel replication may result in a reduction of the apparent resolution of the image, or an increases in the visual noise or graininess.

Color images may be reproduced using multiple halftone screens. For example, when using cyan, magenta, yellow and black printing inks, images are processed to produce color separations, or color channels, and each color separation is reproduced using a method similar to that for monochrome images. These, when overlaid, form complex patterns of color mixtures on a very small scale. When viewed at normal viewing distances the limited resolving power of the observer's eye merges these patterns together to cause the sensation of nearly homogeneous areas of color. The periodic patterns used with conventional clustered dot screening disturb the homogeneous sensation adding to the "roughness" of color tone. Many of the "random" screening methods produce images that appear "grainy" or "noisy," and so do not have a homogeneous, or smooth appearance.

It would be desirable to be able to produce halftone patterns that have combinations of both random and ordered structures that have properties of increased perception of smoothness, homogeneity of color, freedom from interference or moiré patterns, and that have controllable cluster sizes to establish stable and controllable printing conditions.

SUMMARY OF THE INVENTION

In order to avoid the disadvantages of conventional random halftoning schemes the method and apparatus of the present invention determines a halftone threshold array, or halftone cell, containing evenly distributed intensity clusters (or "EDICs").

In accordance with the present invention this is achieved by means of a process that alternately selects pixels in the halftone cell to be added to the head and then the tail of the order of illumination of pixels from 0% intensity to 100% intensity until the order of illumination of all pixels in the halftone cell has been set. This processing is performed by using two arrays sharing the same domain as the eventual halftone cell. The first array represents the distribution of intensities due to pixels added to the head of the illumination order and is referred to as the "head intensity array." The second array represents the distribution of intensities due to pixels added to the tail of the illumination order and is referred to as the "tail intensity array."

Whenever the processing is to select a pixel to add to the tail of the illumination order it selects the pixel that corresponds to the minimum value in the tail intensity array and which has not yet been selected. Whenever the processing is to select a pixel to add to the head of the illumination order it selects the pixel that corresponds to the minimum value in the head intensity array and which has not yet been selected.

Whenever the processing has added a pixel to the tail of the illumination order a value derived from an intensity dispersal function is added to elements in the tail intensity array. Whenever the processing has added a pixel to the head of the illumination order a value derived from an intensity dispersal function is added to elements in the head intensity array.

The order of illumination of pixels due to the processing described can then be used to generate a halftone cell description suitable for use by image rendering software and/or hardware.

The resulting halftone cell has improved visual and printing characteristics as the evenly distributed intensity clusters have many of the benefits of a purely random screen without the uncontrolled noise inherent in such a scheme.

BRIEF DESCRIPTION OF THE DRAWINGS

FIG. 1(a) illustrates the order of illumination of a 16×16 halftone cell. FIG. 1(b) illustrates pixel illumination for an image of 50% intensity using a halftone cell as shown in FIG. 1(a). In FIG. 1(b) those pixels that correspond to an order of illumination value less than 128 are illustrated.

FIG. 3(a)–(c) illustrates three data arrays used to determine a halftone cell using evenly distributed intensity clusters in accordance with the present invention. The elements of the data arrays as illustrated are set to their initial values.

FIG. 5(a)–(c) illustrates the data arrays shown first in FIG. 3 with the elements of the data arrays set to values corresponding to a partially-completed point in the processing described in FIG. 4.

FIG. 6(a) illustrates the order of illumination of a 16×16 EDIC halftone cell. FIG. 6(b) illustrates pixel illumination for an image of 50% intensity using a halftone cell as shown in FIG. 6(a). FIG. 6(c) illustrates pixel illumination for an image of 50% intensity using a halftone cell as shown in FIG. 6(a) as part of a larger portion of a display than shown in FIG. 6(b).

FIG. 7 illustrates a flow chart of additional processing to use an existing halftone cell in the determination of a new halftone cell incorporating EDIC.

FIG. 8(a)–(b) illustrates an EDIC halftone cell where the order of illumination of pixels described by the halftone shown in FIG. 1(a) was used to determine the new EDIC halftone cell in accordance with the additional processing shown in FIG. 7. Specifically, FIG. 8(a) illustrates the order of illumination of a 16×16 modified EDIC halftone cell. FIG. 8(b) illustrates pixel illumination for an image of 50% intensity using a halftone cell as shown in FIG. 8(a).

DETAILED DESCRIPTION OF THE DRAWINGS

Figures 1A, 1B:
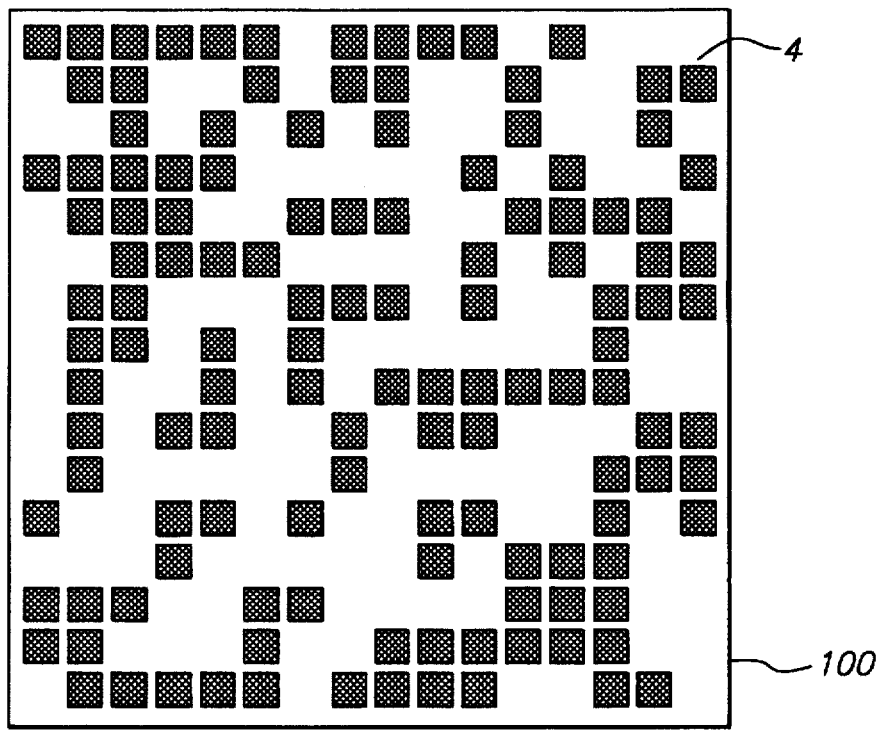
FIG. 1(a)–(b) illustrates a conventional random halftone cell. Specifically.

Referring now to FIG. 1(a), there is shown a conventional 16×16 random halftone cell 100 comprised of 256 pixels, e.g., 3. In accordance with the halftone cell 100, the order of illumination of pixels is chosen using a random number generator without replacement and is given by a number between 0 and 255 inclusive assigned to each pixel shown in FIG. 1(a). For example, the pixel assigned number 0 is illuminated first and the pixel assigned number 255 is illuminated last. FIG. 1(b) is another representation of halftone cell 100 showing the illumination of pixels, e.g., 4, resulting from a 50% intensity image displayed in accordance with the order of illumination of FIG. 1(a). As is evident from FIG. 1(b), certain portions of cell 100 have few illuminated pixels, resulting in "blotches" in the image. If random illumination results in sufficiently large blotches, such blotches may become easily visible and distracting artifacts to the overall image.

Figure 2A:
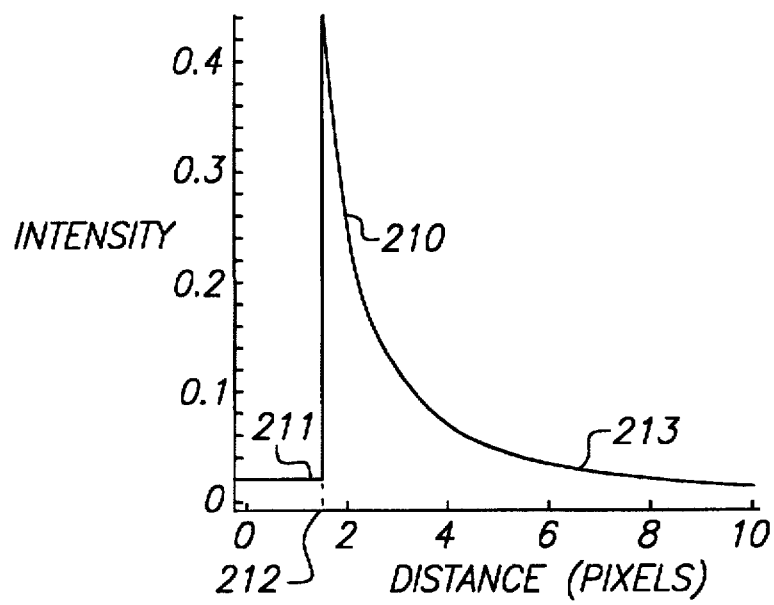
FIG. 2(a)–(b) illustrates two examples of intensity dispersal functions in accordance with the present invention.

Referring now to FIG. 2(a), there is shown a graph of an intensity dispersal function (IDF) 210, used in accordance with the processes described by the flow chart shown in FIG. 4, discussed in further detail below. The IDF is used to generate an intensity value from a distance value. The purpose of the IDF is to produce an even dispersal of clusters in the halftone cell and to control the sizes of the clusters in the halftone cell. The IDF 210 comprises a flat section 211 which generates a constant intensity value for all distance values less than the threshold distance 212 and a curved section 213 which generates an intensity value according to the equation:

INTENSITY=1/(DISTANCE*DISTANCE).

The intensity of the flat section 211 of the IDF 210, and the threshold distance 212, both affect the size of pixel clusters in the halftone cell. Two of the properties of the IDF 210 are as follows: the size of pixel clusters in the halftone cell increases as the intensity of the flat section, e.g., 211, decreases, the size of pixel cluster in the halftone cell increases as the threshold distance, e.g., 212, increases.

Figure 2B:
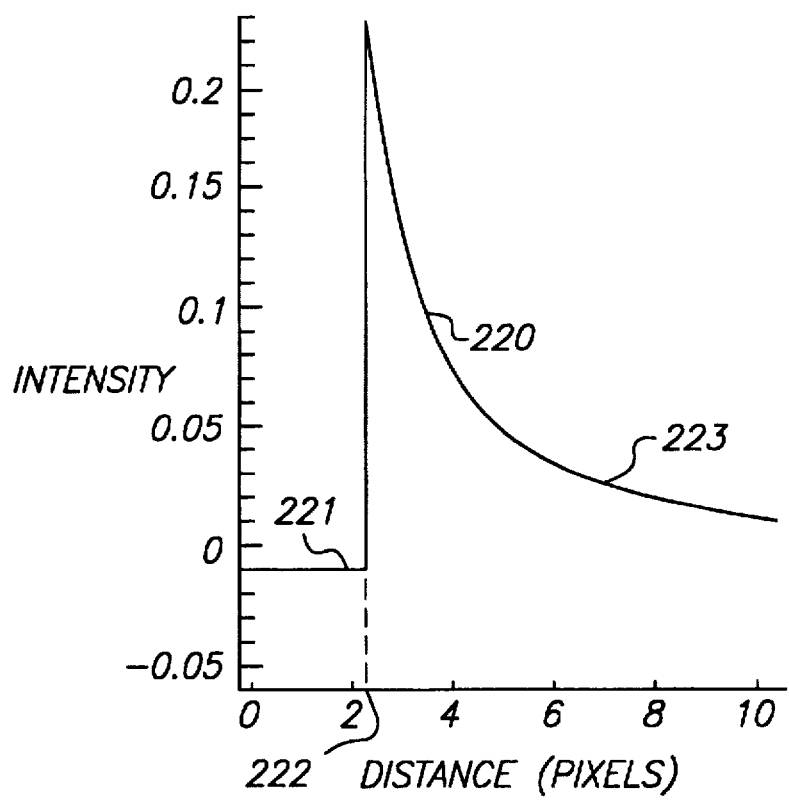

Referring now to FIG. 2(b) there is shown an IDF 220 which if used instead of the IDF 210 shown in FIG. 2(a) would produce a halftone cell with pixel clusters larger than those produced by using the IDF 210 shown in FIG. 2(a). This effect is in part due to the lower intensity of the flat section 221 compared to section 211 and in part due to the greater distance value of threshold distance 222 compared with threshold distance 212. The curved section 223 is derived from the same equation as the curved section 213 in FIG. 2(a) i.e.:

INTENSITY=1/(DISTANCE*DISTANCE).

Referring now to FIG. 3(a), there is shown a 16×16 illumination order array 300 of elements, e.g., 5, set to their initial value −1. These elements are used to represent the illumination order of the elements of the 16×16 halftone cell which is to be determined in accordance with the present invention. The value, −1, is interpreted by processing described by the flow chart in FIG. 4 as signifying that the element with that value has not yet had its position in the illumination order determined.

Figure 3B:
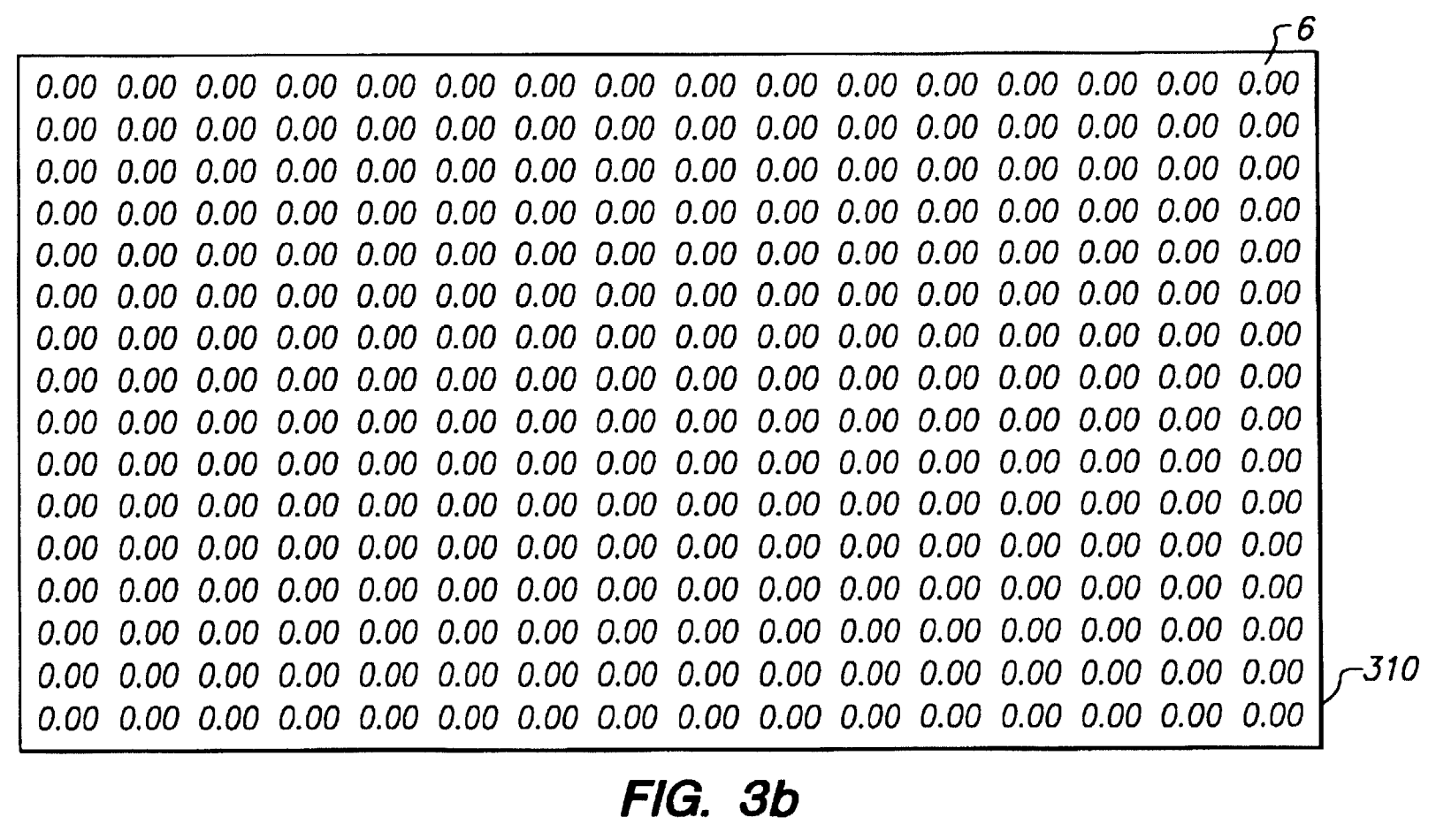

Referring now to FIG. 3(b) there is shown a 16×16 head intensity array 310 of elements, e.g., 6, sharing the same domain as the array 300, set to their initial value of 0. These values represent the intensity of each element due to the processing, as in FIG. 4, relating to the addition of pixels to the head of the illumination order.

Referring now to FIG. 3(c) there is shown a 16×16 tail intensity array 320 of elements, e.g., 7, sharing the same domain as the array 300, set to their initial value of 0. These values represent the intensity of each element due to the processing, as in FIG. 4, relating to the addition of pixels to the tail of the illumination order.

Figure 4:
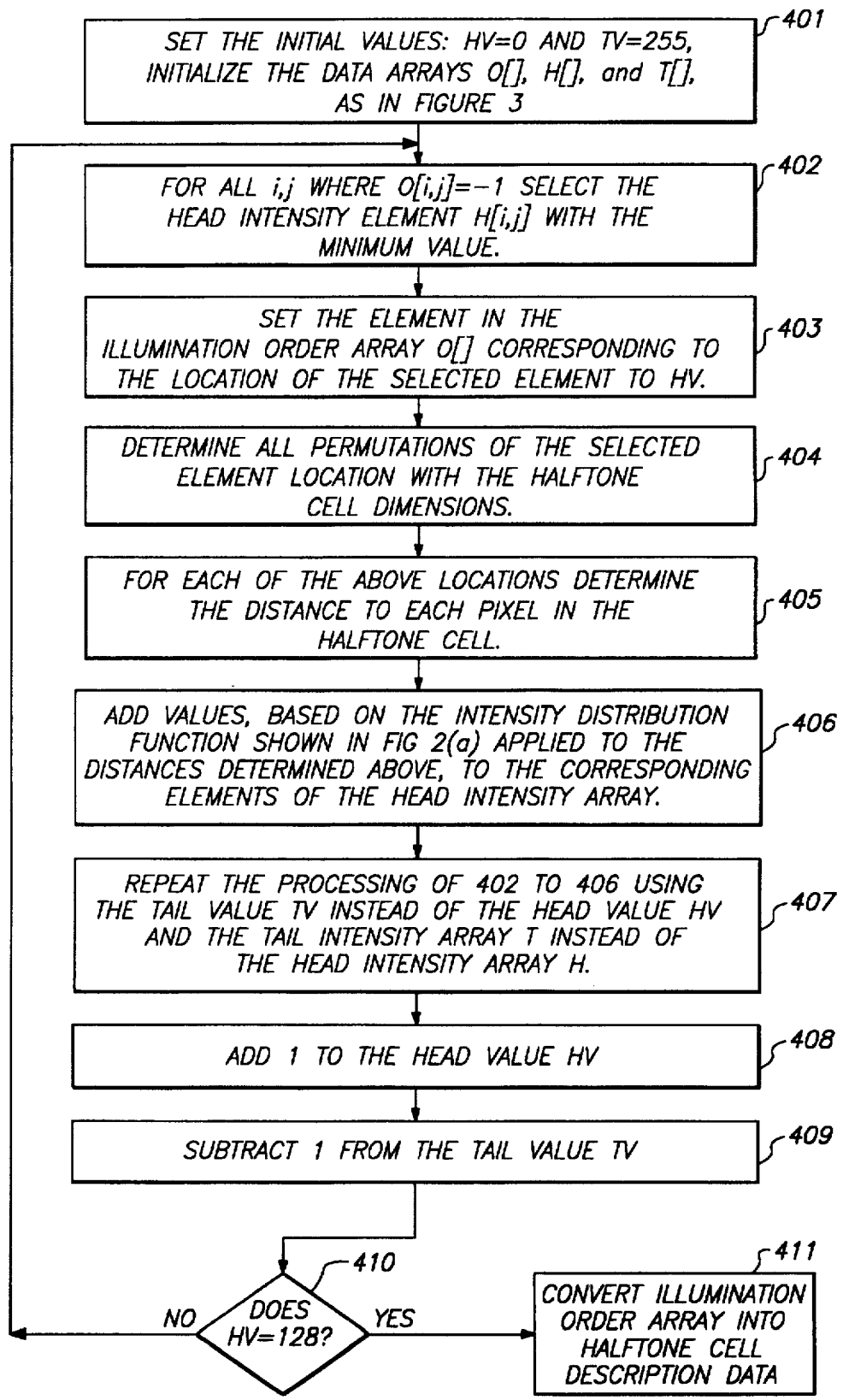
FIG. 4 illustrates a flow chart of processing to determine a halftone cell in accordance with the present invention.

Referring now to FIG. 4 there is shown a flow chart of processing to determine a halftone cell description in accordance with the present invention. The illumination order array shown first in FIG. 3(a) is referred to in FIG. 4 as O[ ]. The head intensity array shown first in FIG. 3(b) is referred to in FIG. 4 as H[ ]. The tail intensity array shown first in FIG. 3(c) is referred to in FIG. 4 as T[ ].

Processing begins by initializing 401 the data arrays and two other pertinent values. A head value HV is set to 0, the number corresponding to the first element in the illumination order of the halftone cell. A tail value TV is set to 255, the number corresponding to the last element in the illumination order. The data arrays O[ ], H[ ] and T[ ], first shown in FIG. 3, are given the initial values shown in FIG. 3.

The element in the head intensity array, corresponding to an element of the illumination order array having the value −1, and having the minimum value of such elements is selected 402. If several elements have the same value the first element encountered with that value is selected. This selection 402 is described by a short pseudocode program using a PASCAL type syntax as follows:

```
min_val := 100000;
FOR j:= 0 TO (cell_height −1) DO
BEGIN
    FOR i:= 0 TO (cell_width −1) DO
    BEGIN
        IF ( (O[ij] = −1) AND (H[I,J] < min_val) ) THEN
        BEGIN
            min_val := H[ij];
            MX := i;
            MY := j;
        END
    END;
END;
``` where the two variables MX and MY specify the location of the selected element.

The element of the illumination order array corresponding to MX, MY is then set 403 to the head value HV. Thus the location of that pixel in the halftone cell illumination order is now set 403, represented in pseudocode as:

O[MX,MY]:=HV;

To ensure the even tessellation of the halftone cell, additional locations are determined 404 corresponding to the pixel at MX, MY replicated in cell positions adjoining the original cell position in the output image. The determination 404 of these locations is represented in pseudocode as:

```
FOR k:=0 TO 8 DO
BEGIN
    X[k] :=MX − cell_width
            + ( cell_width * (k MOD 3) );
    Y[k] := MY − cell_height
            + ( cell_height * TRUNC (k / 3) );
END;
``` where X[ ] and Y[ ] are 9 element data arrays.

The distances between each pixel in the halftone cell and the 9 X[ ],Y[ ] pairs are determined 405 using the following pseudocode procedure:

```
FOR j:=0 to (cell_height −1) DO
BEGIN
    FOR i:=0 TO (cell_width − 1) DO
    BEGIN
        FOR k:=0 TO 8 DO
        BEGIN
            D[i,j,k] :=
                SQRT( (X[k]−i)*(X[k]−i) + (Y[k]−j*(Y[k]−j) );
        END;
    END;
END;
``` where D[ ] is a 3 dimensional 16×16×9 array for storing the determined 405 distances.

Values, from the IDF shown in FIG. 2(a) dependent on the distances in D[ ], are added 406 to the corresponding elements of the head intensity array H[ ]. This addition 406 is performed using the following procedure:

```
FOR j:=0 TO (cell_height -1) DO
BEGIN
    FOR i:=0 TO (cell_width - 1) DO
    BEGIN
        FOR k:=0 TO 8 DO
        BEGIN
            H[i,j] := H[i,j] + IDF (D[i,j,k]);
        END;
    END;
END;
``` where IDF( ) is a function that returns the values shown in FIG. 2(a) dependent on the distance parameter D[i,j,k]. It should be noted that while processes 404, 405 and 406 are separated in FIG. 4 to increase clarity of explanation, a more efficient process would combine 404, 405 and 406 thus obviating the need for distance data array D[ ].

The processes 402 to 406 are then repeated 407 using the tail value TV instead of the head value HV and the tail intensity array T instead of the head intensity array H. The purpose of this modified repetition 407 is to ensure that the characteristics of the halftone cell in accordance with the present invention are symmetric between the head and the tail of the illumination order of the halftone cell.

The head value HV is incremented 408 and the tail value TV is decremented 409.

A test 410 is made to see if HV=128. If it is, the intensity processing is complete, all the elements of the illumination order array have been set, and the processing proceeds to 411. Otherwise the processing returns to 402.

The illumination order thus obtained is converted 411 into a halftone cell description data format. It should be recognized that if this processing is employed in an environment where an output pixel may have more than two levels, known methods may be used to apply the halftone cell description to a multilevel output device.

It should also be recognized that known programming optimizations may be applied to increase the speed of the above determination of an EDIC halftone cell, for instance implementing the IDF( ) function by means of a look up table. It should further be recognized that the above processing produces a halftone cell with symmetric properties between the head and the tail of the illumination order. If non-symmetric properties are required, for example to compensate for the characteristics of a particular printing process, then such a non-symmetric EDIC halftone cell can be generated by, for instance, using different IDFs for the calculation of the head and tail intensities.

Referring now to FIG. 5(a) there is shown an order of illumination array 500 resulting from the processing of FIG. 4, at the point in the processing at which half the elements have been set. At this point in the processing the value of the next head value HV is 64 and the value of the next tail value TV is 191. The element labeled 501 is the element corresponding to the element in the head intensity array that has the minimum value of those elements in the illumination order array that have value −1. The element 501 will therefore be the next element to be assigned the HV value 64. The element labeled 502 is the element corresponding to the element in the head intensity array that has the minimum value of those elements in the illumination order array that have value −1. The element 502 will therefore be the next element to be assigned the TV value 191.

Referring now to FIG. 5(b) there is shown the head intensity array 510 with values at the same point in the processing as shown in FIG. 5(a). The element corresponding to element 501 in the illumination order array is labeled 511.

Referring now to FIG. 5(c) there is shown the tail intensity array 520 with values at the same point in the processing is FIG. 5(a). The element corresponding to element 502 in the illumination order array is labeled 522.

Figures 6A, 6B:
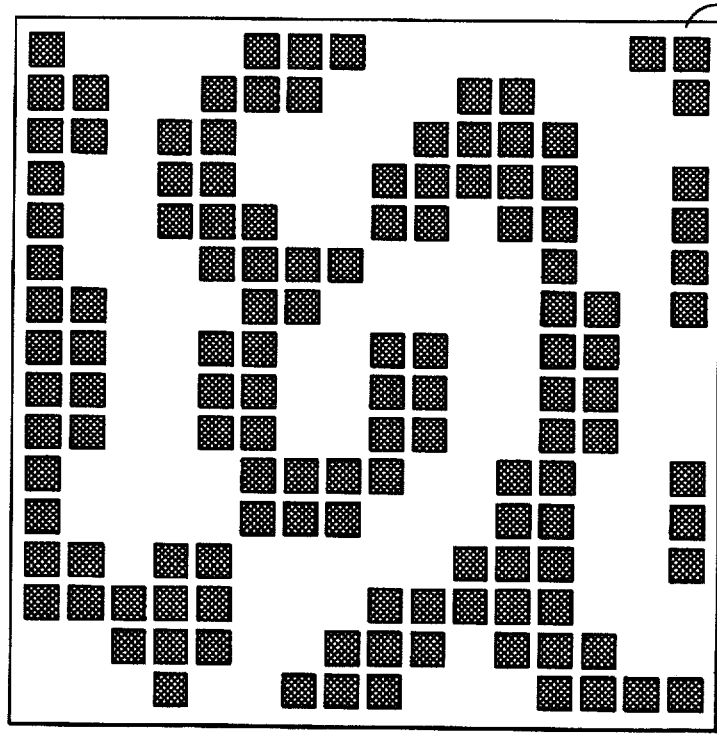
FIG. 6(a)–(c) illustrates an EDIC halftone cell. Specifically.

Referring now to FIG. 6(a) there is shown a complete 16×16 EDIC halftone cell illumination order array 600 comprised of 256 pixels, e.g., 8. The order of illumination of pixels is determined in accordance with the present invention as set out in FIG. 4 and is given by the number between 0 and 255 inclusive assigned to each pixel shown in FIG. 6(a). The pixel assigned number 0 is illuminated first and the pixel assigned number 255 is illuminated last. A display having a pixel map that results when a 50% intensity image is displayed using the halftone cell in FIG. 6(a) is illustrated as FIG. 6(b).

Figure 6C:
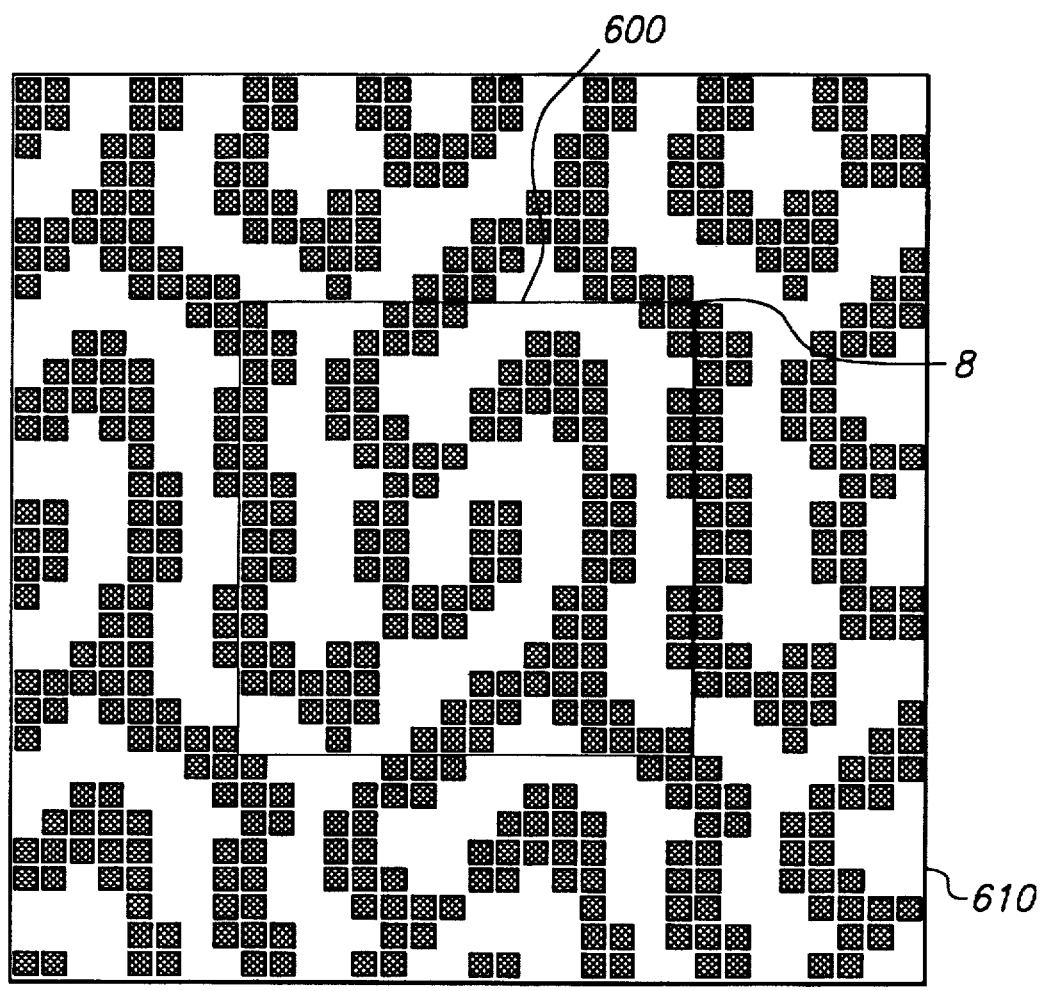

Referring now to FIG. 6(c) there is shown array 600 as a part of a larger portion 610 of a display. It has been found that in practice, such halftone cells comprising evenly distributed intensity clusters (EDIC) do not lead to the distracting blotches that have characterized prior screening techniques. The visual appearance of FIG. 6(c) is of an irregular interleaving structure having parallel structures in the manner of a human fingerprint but without the directional regularity of a fingerprint.

Figures 7, 8A:
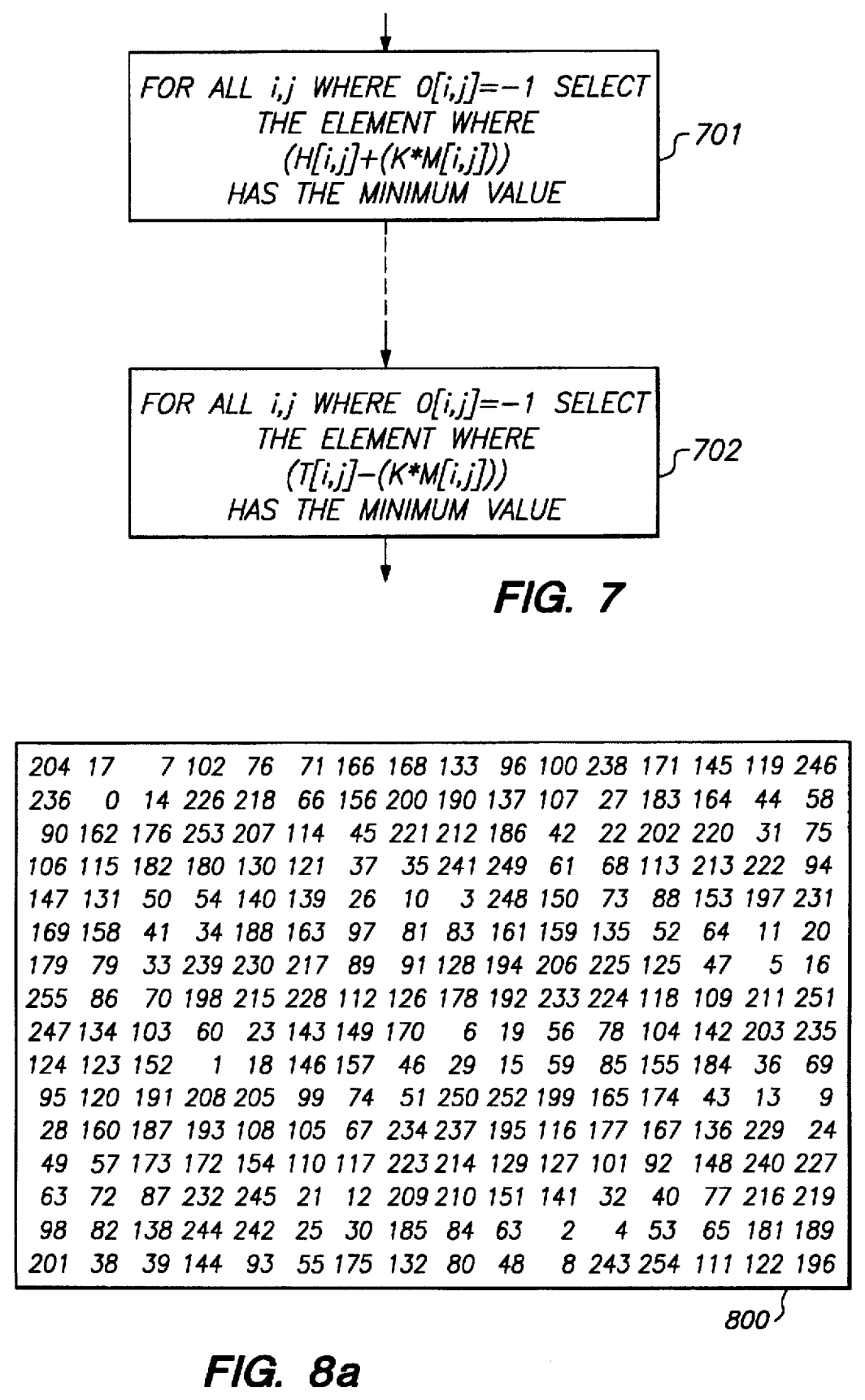

Referring now to FIG. 7 there are shown altered portions of the selection process 402 shown in FIG. 4 that enables the use of a separately defined halftone cell illumination order to modify the determination of a new illumination order according to the invention. This additional step is useful, because it provides a way of controlling the shapes that are visible in the midtones of the final halftone cell. The existing, separately defined, halftone illumination order array is referred to as M[ ] in FIG. 7. The factor which controls the degree by which the new halftone cell is modified by the existing halftone cell is referred to, in FIG. 7, as K. During the selection of the next element in the head intensity array to be set in the illumination order, selection 701 is substituted for selection 402 in FIG. 4. During the selection of the next element to be set in the tail intensity array, selection 702 is substituted for selection 402 in FIG. 4. It should be noted that whereas a positive quantity is added to the head intensity array due to the rank of the corresponding pixel in the existing halftone illumination order in 701, a negative quantity is added to the tail intensity in 702. This has the effect of maximizing the differentiation of effect due to the existing halftone illumination order between the head and the tail intensities for any given value of K.

It should be recognized that regular as well as irregular halftone cell data, or halftone cell intensity data, may be used to modify the determination of a new halftone cell illumination order as described for instance in FIG. 7, in accordance with the present invention.

Figure 8B:
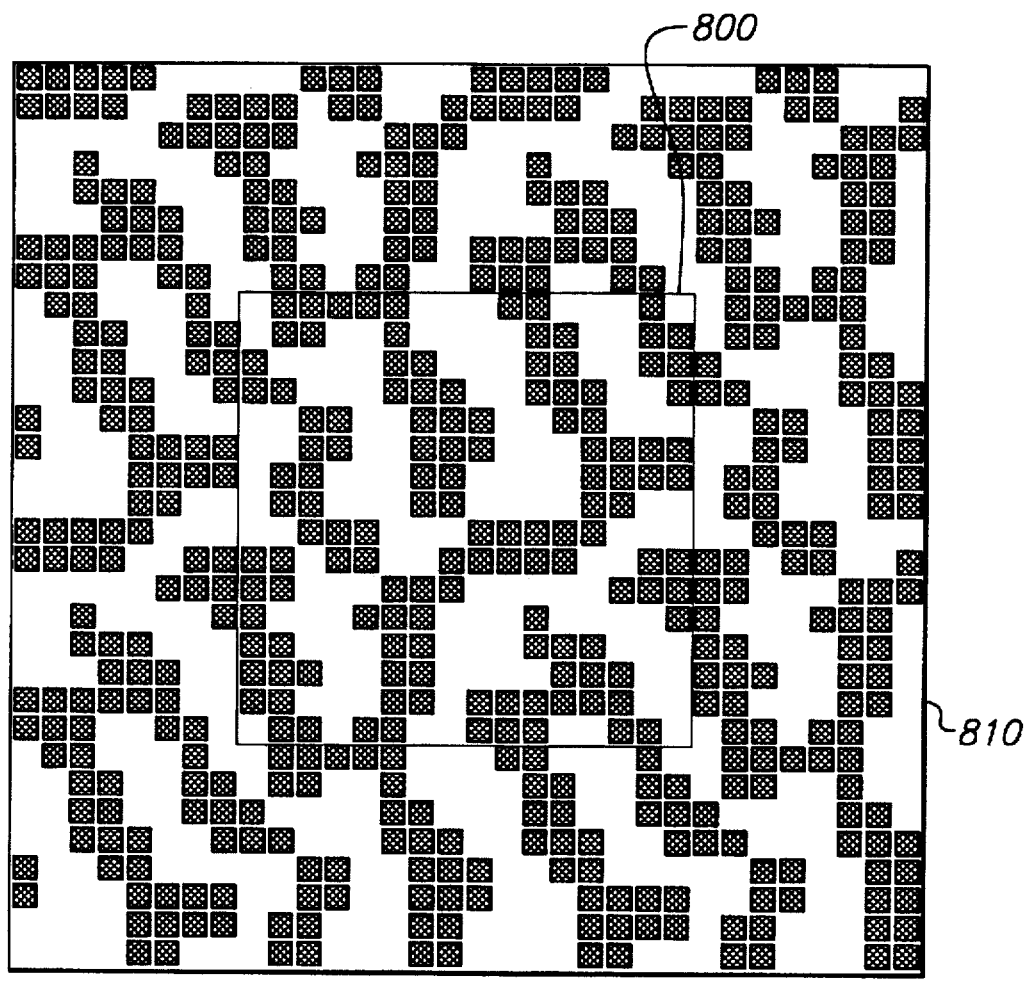

Referring now to FIG. 8(a) there is shown a modified 16×16 EDIC halftone cell 800. The order in which pixels are illuminated as the intensity of the image increases is determined in accordance with the present invention as set out in FIG. 4 with the additional process shown in FIG. 7. The illumination order M[ ] used to modify the determination of the halftone is that shown in FIG. 1(a) (a conventional random halftone cell illumination order). The factor K used in selections 701 and 702 shown in FIG. 7 is 0.00195. FIG. 8(b) illustrates a display portion 810 that results when a 50% intensity image is displayed using the halftone cell in FIG. 8(a).

Figure 9:
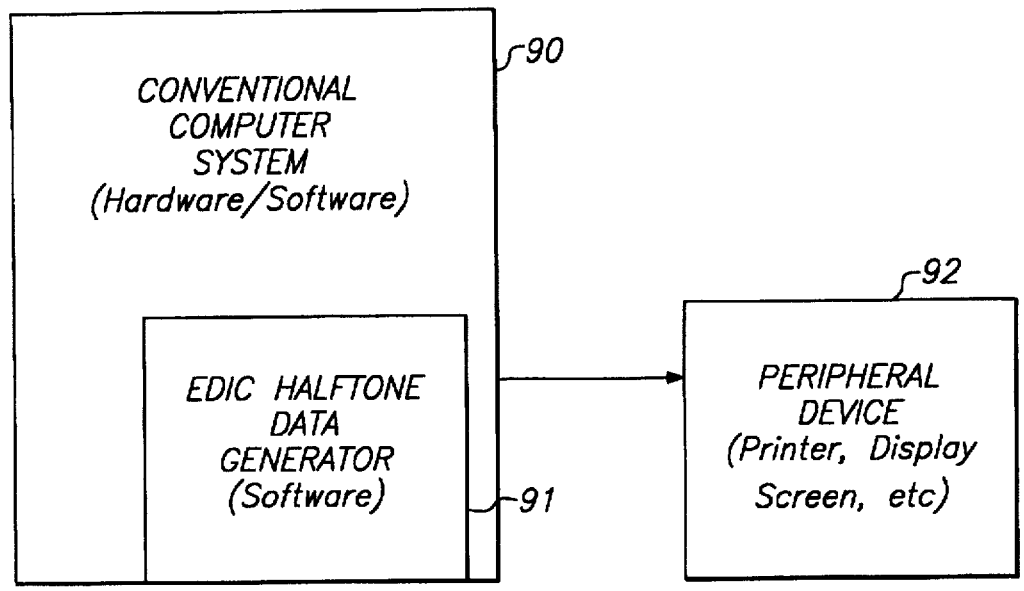
FIG. 9 illustrates one embodiment of apparatus in accordance with the present invention.

Referring now to FIG. 9 one embodiment of the present invention is implemented using a conventional personal computer system 90 including a computer software EDIC halftone generator 91 written in the 'C' programming language to determine halftone cell values according to the invention and to generate halftone cell description data in accordance with the present invention. The halftone cell descriptions created by the halftone generator 91 are loaded in a conventional manner to memory (not shown) and thereafter become the default halftone screening descriptions for the peripheral device 92. The preferred embodiment specifies such description data as a table to operate under the "POSTSCRIPT" computer graphics standard. In accordance with the preferred embodiment, image data is processed in a conventional manner via a POSTSCRIPT interpreter program, in the computer or attached peripheral device, loaded with the data table produced by the halftone generator 91. Alternatively, the halftone generator could be incorporated directly into a POSTSCRIPT interpreter program. Either way, conventional means such as look-up tables or computer language statements may be used to implement the EDIC halftone generator of the present invention.

Figure 10:
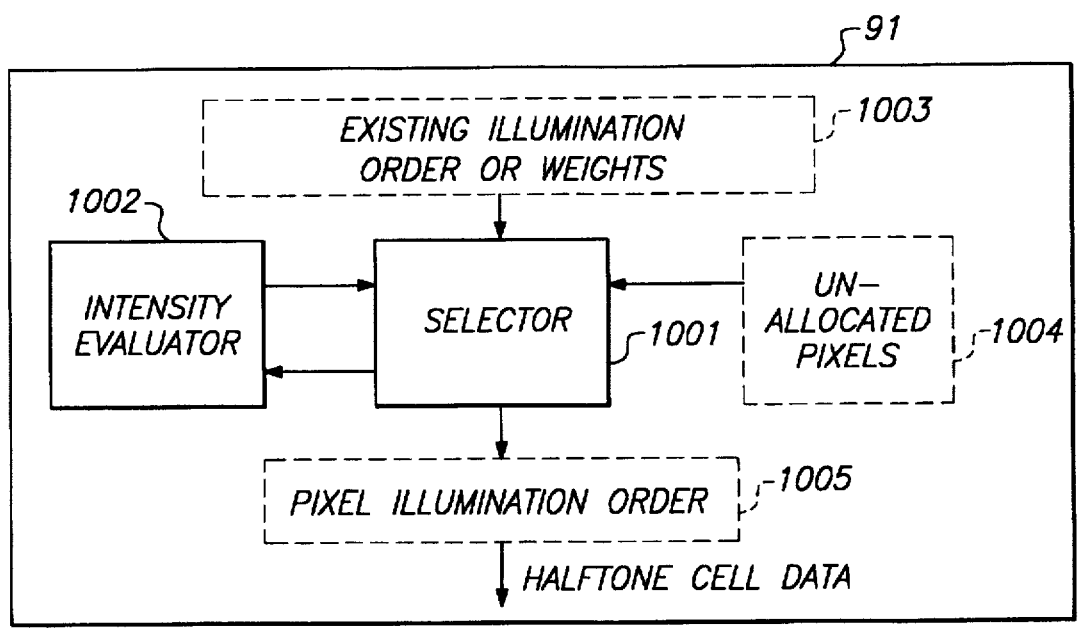
FIG. 10 illustrates in greater detail the EDIC halftone data generator illustrated in FIG. 9.

Referring now to FIG. 10, there is illustrated in greater detail the EDIC halftone generator 91 of FIG. 9. In FIG. 10 dashed boxes indicate data items. Pixel selector 1001 selects pixels to be added to the pixel illumination order 1005 from a list of the remaining unallocated (not previously added to the illumination order) pixels 1004, by inspecting intensity data from the intensity evaluator 1002. The intensity evaluator 1002 evaluates the intensities of those pixels that have previously been selected by the selector 1001 and added to the illumination order 1005. Additionally, as described for example in FIG. 7, the selector 1001 may use an additional illumination order or set of halftone pixel weights to modify the selection due to the intensity evaluator 1002. When all unallocated pixels 1004 have been allocated and their ranks in the illumination order 1005 fixed, the pixel illumination order 1005 is complete and it is then used as halftone cell data.

An exemplary "C" language program listing in accordance with the present invention to produce an 80×80 pixel halftone cell is reproduced below:

```
#include <stdlib.h>
#include <math.h>
#include <stdio.h>
#define CELL_WIDTH 80
#define CELL_HEIGHT 80
#define IDF1
#ifdef IDF1
double idf (double d)
{
    if (d < 1.9) {
        return 0.04;
    } else {
        return (1 / (d*d));
    }
}
#else
double idf (double d)
{
    if (d < 2.1) {
        return -0.01;
    } else {
        return (1 / (d*d));
    }
}
#endif
void generate_edi_vignette( )
{
    int HV,TV,MX,MY,tx,ty,k,i,j,n;
    double distance;
    int O[CELL_WIDTH] [CELL_HEIGHT];
    double H[CELL_WIDTH] [CELL_HEIGHT];
    double T[CELL_WIDTH] [CELL_HEIGHT];
    unsigned int THRESH[CELL_WIDTH] [CELL_HEIGHT];
    int min_i,min_j;
    double min_val;
    FILE *ofid;
    for (j = 0; j < CELL_HEIGHT; j++) {
        for (i=0; i < CELL_WIDTH; i++) {
            O[i][j] = -1;
            H[i][j] = 0.0;
            T[i][j] = 0.0;
        }
    }
    HV = 0; TV = CELL_HEIGHT * CELL_WIDTH - 1;
    do {
        min_val = 100000;
        for (j=0; j < CELL_HEIGHT; j++) {
            for (i=0; i < CELL_WIDTH; i++) {
                if ( (O[i][j] == -1) && (H[i][j] < min_val)) {
                    min_val = H[i][j];
                    MX = i;
                    MY = j;
                }
```

```
        }
}
O[MX] [MY] = HV;
for (k=0; k < 9; k++) {
        tx = MX - CELL_WIDTH + CELL_WIDTH * (k - 3 * (k / 3));
        ty = MY - CELL_HEIGHT + CELL_HEIGHT * (k / 3);
        for (j=0; j < CELL_HEIGHT; j++) {
                for (i=0; i < CELL_WIDTH; i++) {
                        distance = sqrt ((tx - i) * (tx - i) + (ty - j) * (ty - j));
                        H[i][j] += idf (distance);
                }
        }
}
min_val = 100000;
for (j=0; j < CELL_HEIGHT; i++) {
        for (i=0; i <CELL_WIDTH; i++) {
                if ((O[i][j] == -1) && (T[i][j] < min_val)) {
                        min_val = T[i][j];
                        MX = i;
                        MY = j;
                }
        }
}
O[MX][MY] = TV;
for (k=0; k < 9; k++) {
        tx = MX - CELL_WIDTH + CELL_WIDTH * (k - 3 * (k / 3));
        ty = MY - CELL_HEIGHT + CELL_HEIGHT * (k / 3);
        for (j=0; j < CELL_HEIGHT; j++) {
                for (i=0; i < CELL_WIDTH; i++) {
                        distance = sqrt ((tx - i) * (tx - i) + (ty - j) * (ty - j));
                        T[i][j] += idf(distance);
                }
        }
}
        HV +=1;
        TV -= 1;
} while (HV < CELL_HEIGHT * CELL_WIDTH / 2);
        for (n = 0; n < CELL_HEIGHT * CELL+WIDTH; n++) {
                min_val = 100000;
                for (j=0; j < CELL_HEIGHT; j++) {
                        for (i=0; i < CELL_WIDTH; i++) {
                                if (O[i][j] < min_val) {
                                        min_i = i;
                                        min_j = j;
                                        min_val = O[i][j];
                                }
                        }
                }
O[min_i] [min_j] =]100000;
THRESH [min_i] [min_j] = n / ((CELL_HEIGHT * CELL_WIDTH) / 256);
}
ofid = fopen ("EDIC_VIG.PS","w+t");
fprintf (ofid, "%%!\n%%%% EDIC_SCREEN\n");
fprintf (ofid, "edic_screen\n");
fprintf (ofid, " <<\n      /HalftoneType 3\n");
fprintf (ofid, "    /Width %d\n       /Height %d\n", CELL_WIDTH, CELL_HEIGHT);
fprintf (ofid, "    /Thresholds <\n     ");
for (j = 0; j < CELL_HEIGHT; j++) {
        for (i = 0; i < CELL_WIDTH; i++) {
                fprintf (ofid, "%02x ", THRESH[i][j]);
        }
        fprintf (ofid, "\n            ");
}
fprintf (ofid, "\n          >\n");
fprintf (ofid, "  >>\ndefn");
fprintf (ofid, "edic_screen sethalftone\n");
fprintf (ofid, "0 1 255 {\n");
fprint (ofid, " dup 255 div setgray 2 mul 20 add 400 2 350 rectfill\n");
fprint (ofid, "} for\n");
fprint (ofid, "0.5 setgray 20 50 512 350 rectfill\n");
fprint (ofid, "showpage\n\n");
fclose (ofid);
}
main ( )
{
        generate_edic_vignette( );
        return (0);
}
```

A pertinent portion of the "POSTSCRIPT" language halftone cell description and display commands that are generated by the execution of the above "C" program are, for convenience, also reproduced below:

```
% !
% % EDIC_SCREEN
/edic_screen
    <<
    /HalftoneType 3
    /Width 80
    /Height 80
    /Thresholds <
        6400 threshold data value
    >
    >>
def
edic_screen sethalftone
0 1 255 {
    dup 255 div setgray 2 mul 20 add 400 2 350 rectfill
} for
0.5 setgray 20 50 512 350 rectfill
showpage
```

Thus a halftone cell incorporates evenly distributed intensity clusters to obtain improved visual and printing characteristics associated with a purely random screen without the uncontrolled noise inherent in such a system.

I claim:

1. A system for displaying images defined by illuminating pixels in an arrangement of halftone cells, comprising:
   a processor, including a clustering intensity evaluator for producing an analysis of a distribution of intensity of previously selected pixels over one of the halftone cells, and a pixel selector for selecting pixels to be added to an order of illumination of pixels of said one halftone cell in response to the results of the analysis by the clustering intensity evaluator; and
   a display device operatively connected to the processor and adapted to display images responsive to the order of illumination.

2. A system as in claim 1, wherein said order of illumination comprises a head portion of pixels to be illuminated first and a tail portion of pixels to be illuminated last, and wherein the pixel selector adds pixels to the head portion and the tail portion.

3. A system as in claim 2, wherein the pixel selector adds pixels to the head portion and the tail portion on an alternating basis.

4. A system as in claim 2, wherein the pixel selector uses different criteria to determine which pixels to add to the head portion and the tail portion.

5. A system as in claim 2, wherein the pixel selector adds pixels to the head portion and the tail portion at different rates.

6. A system as in claim 1, wherein the intensity evaluator uses as a parameter for selection relative adjacency of a candidate pixel to said previously selected pixels.

7. A system as in claim 6, wherein the parameter of a candidate pixel is maintained as an element in an intensity array.

8. A system as in claim 7, wherein separate intensity arrays are maintained for a head portion and a tail portion of said order of illumination.

9. A system as in claim 6, wherein the parameter used by the clustering intensity evaluator has a non monotonically defined value responsive to distance from the candidate pixel to a selected one of the previously selected pixels.

10. A system as in claim 6, wherein the parameter used by the clustering intensity evaluator has a constant value over a distance from the candidate pixel to a selected one of the previously selected pixels responsive to the distance being below a predetermined threshold, and has a changing value over distance from the candidate pixel to a selected one of the previously selected pixels responsive to the distance being above the predetermined threshold.

11. A system as in claim 10, wherein the constant value is less than a maximum value of the changing value.

12. A system as in claim 10, wherein the changing value decreases monotanically as the distance increases from the threshold.

13. A system as in claim 10, wherein the constant value is less than zero.

14. A method of displaying images defined by illuminating pixels in an arrangement of halftone cells, comprising:
   (a) selecting for illumination a first pixel from a current halftone cell;
   (b) determining a clustering intensity array responsive to results obtained in (a);
   (c) selecting subsequent pixels from the current halftone cell for illumination;
   (d) modifying the clustering intensity array responsive to results obtained in (c);
   (e) repeating (c) and (d) until all pixels in the halftone cell are selected; and
   (f) determining an order of illumination of the halftone cell responsive to the order in which pixels were selected in (a) and (c).

15. A method as in claim 14, wherein the clustering intensity array includes a head intensity array and a tail intensity array and wherein (c) includes selecting head pixels corresponding to a first set of criteria with respect to the head intensity array and selecting tail pixels corresponding to a second set of criteria with respect to the tail intensity array.

16. A method as in claim 15, wherein pixels are selected in (c) responsive to relative adjacency of a candidate pixel for selection to pixels already selected.

17. A method as in claim 16, wherein the likelihood that a candidate pixel is selected is non monotonically determined with respect to a distance from the candidate to one of the pixels already selected.

18. A method as in claim 16, wherein a candidate pixel is more likely to be selected if a distance from the candidate to one of the pixels already selected is below a threshold than if the distance is slightly above the threshold.

19. A method as in claim 16, wherein a candidate pixel is more likely to be selected if a distance from the candidate to one of the pixels already selected is far above a threshold than if the distance is slightly above the threshold.

20. A method as in claim 16, wherein the second candidate pixel is selected responsive to a distance from the candidate to the pixel already selected being less than a threshold.

* * * * *